Figure 1:
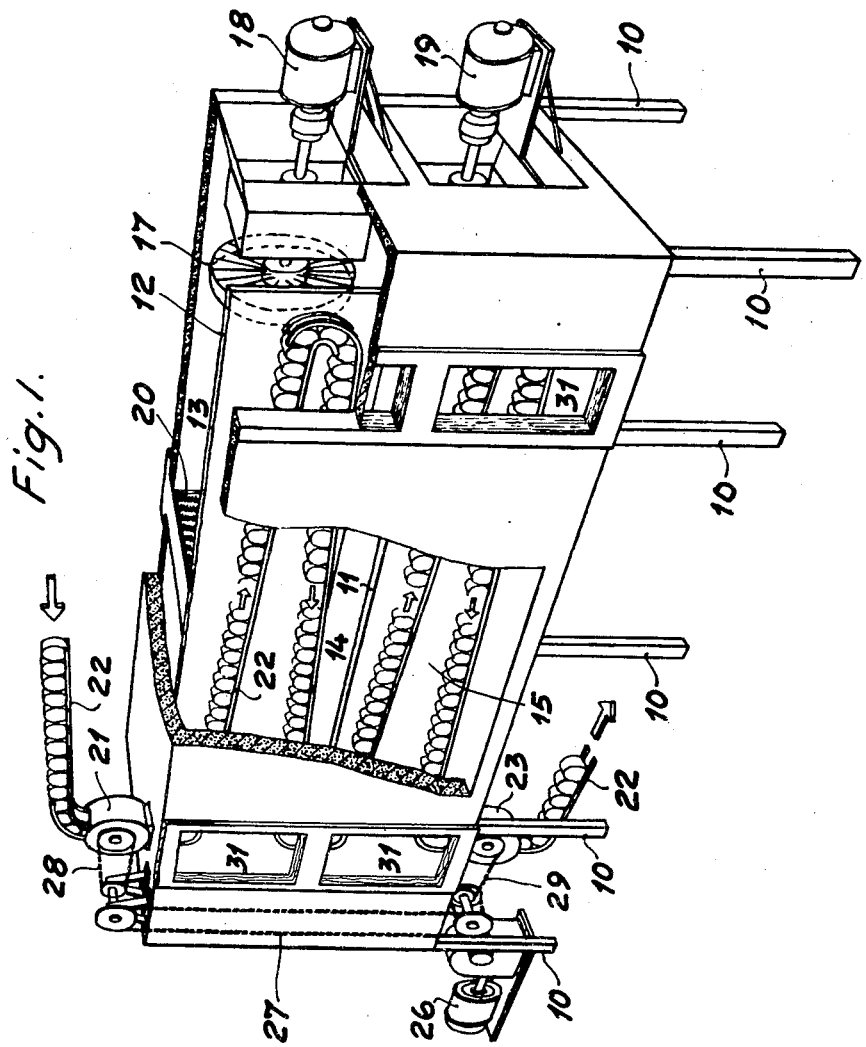

Feb. 1, 1955  E. A. EKELUND  2,701,205
STERILIZATION OF FOODS

Filed Oct. 2, 1951  2 Sheets-Sheet 1

United States Patent Office 2,701,205
Patented Feb. 1, 1955

2,701,205
STERILIZATION OF FOODS

Einar Ansgarius Ekelund, Enebyberg, Sweden, assignor to Kooperativa Forbundet Forening u. p. a., Stockholm, Sweden Application October 2, 1951, Serial No. 249,230

Claims priority, application Sweden October 6, 1950

6 Claims. (Cl. 99—214)

In the sterilization of foods, such as fruit, berries, vegetables, meat and fish, on a larger scale the hermetically closed cans, containing the food to be sterilized, are usually placed in high pressure autoclaves, in which they are given the necessary temperature for a certain time by the action of steam or water.

In addition to the fact that such autoclave plants involve high establishing expenses they are connected with several inconveniences. In usual high pressure autoclaves for periodical operation a certain time (usually 15 to 20 minutes) is necessary before the temperature of the autoclave reaches the right sterilization temperature. The time necessary to raise the temperature in the centre of the innermost can to the temperature necessary for the product to be sterilized is then determined, about 117° C., for example, for certain meat foods. After the sterilization is finished the pressure must be allowed to sink slowly in order to equalize the pressure in the cans. This will take further 15 to 20 minutes in addition to the time necessary for sterilization and it is not possible to give the product the proper heat treatment as the treatment cannot be exactly controlled. The heat losses are relatively large when sterilizing in autoclaves on account of losses in conduits etcetera at the same time as expensive high pressure boilers have to be used for the generation of high pressure steam. Continuously operating high pressure autoclaves are connected with the inconvenience that if a can or container would catch, there is no possibility to eliminate the fault rapidly but the whole charge will be spoilt as the autoclave cannot be opened for one to two hours. For such an autoclave of great capacity such an inconvenience means not only losses of the food but also losses in the form of a standstill.

It is also known to treat food stuffs at pasteurization temperature by means of a current of gas, such as air. Said processes differ principally from a treatment at sterilization temperature in which pathogene as well as non-pathogene microorganisms are to be killed. Irrespective of the higher temperature necessary in sterilization it has been found that the speed of the current of gas is of vital importance in order to obtain a good result. The present invention is based on this fact and may be applied especially when using containers of metal, such as cans, for the material to be treated. According to the invention it is possible to reach the necessary temperature contrary to what has been the case earlier and without danger of destroying the casing. In this way it is possible to reach the necessary treating temperature in six minutes.

The said disadvantages are eliminated according to the present method which is characterized in that a dry, non-condensing current of gas, such as air, heated at least to sterilization temperature is caused to circulate at atmospheric pressure directly in contact with the containers in which the food to be sterilized is placed and that the current of gas is given a speed of at least 5 m./sec., preferably 5-8 m./sec. The sterilization may be effected at a temperature below 180° C., for example between 80 and 150° C., and may preferably be carried out continuously whereby the cans are caused to pass through the sterilization chamber by their own weight. It is suitable to proceed in such a manner that the cans are first subjected to the action of a current of gas having a temperature above sterilization temperature and then to the action of a current of gas having a lower temperature. The temperature of the current of gas to which the cans are first exposed must, of course, not be so high that damages occur. When the temperature in the cans has reached the sterilization temperature value, said temperature is maintained by introducing the cans in a current of gas having a temperature of about sterilization temperature. The cans may be caused to pass through one or more sterilization chambers which are divided into two compartments in which air having a temperature above sterilization temperature is circulating and then through a chamber arranged in the same manner, in which the temperature is kept at a lower value.

A special apparatus is provided for carrying out the method of the invention. The characterizing features for the apparatus is that it comprises a sterilization chamber which by means of a partition is divided into two compartments communicating with each other. In one of the compartments there is provided a fan or the like for circulation of the current of gas and a heater for heating the current of gas and in the other compartment there is provided a conveyor for the cans containing the material to be sterilized. The conveyor is preferably inclined so that the cans are transported through the chamber by their own weight.

By using a circulating current of gas according to the invention the advantage is obtained that the sterilization may be carried out at atmospheric pressure, but nevertheless at the temperatures necessary. Besides the gas velocity the gas distribution is of great importance according to the invention. Thus, it is important to keep the cans in the intensive portion of the current of gas during the passage through the sterilization apparatus. Further, the advantage is obtained that the cans or hermetically closed containers always are kept clean which is impossible in sterilization by means of water or steam. The operation may be interrupted immediately and it is possible to put the hand into such a sterilization chamber without disadvantage and take out defective can or place it in its proper position if it would have come in a wrong position even if the temperature amounts to about 170° C. In dry air having a temperature of 170° C. a wet body obtains a surface temperature of not more than about 40° C. depending on the evaporation. Further, it is possible to discover leakage of the cans in another way than hitherto and the risks connected with the application of high pressure steam are avoided.

In addition to the fact that sterilization according to the present invention is less expensive than sterilization by means of high pressure steam it is also possible to carry out sterilization of small charges economically which is quite out of the question when using a large autoclave.

The current of gas may be heated by means of electric heaters or indirectly by means of steam or in another suitable way.

Figure 2:
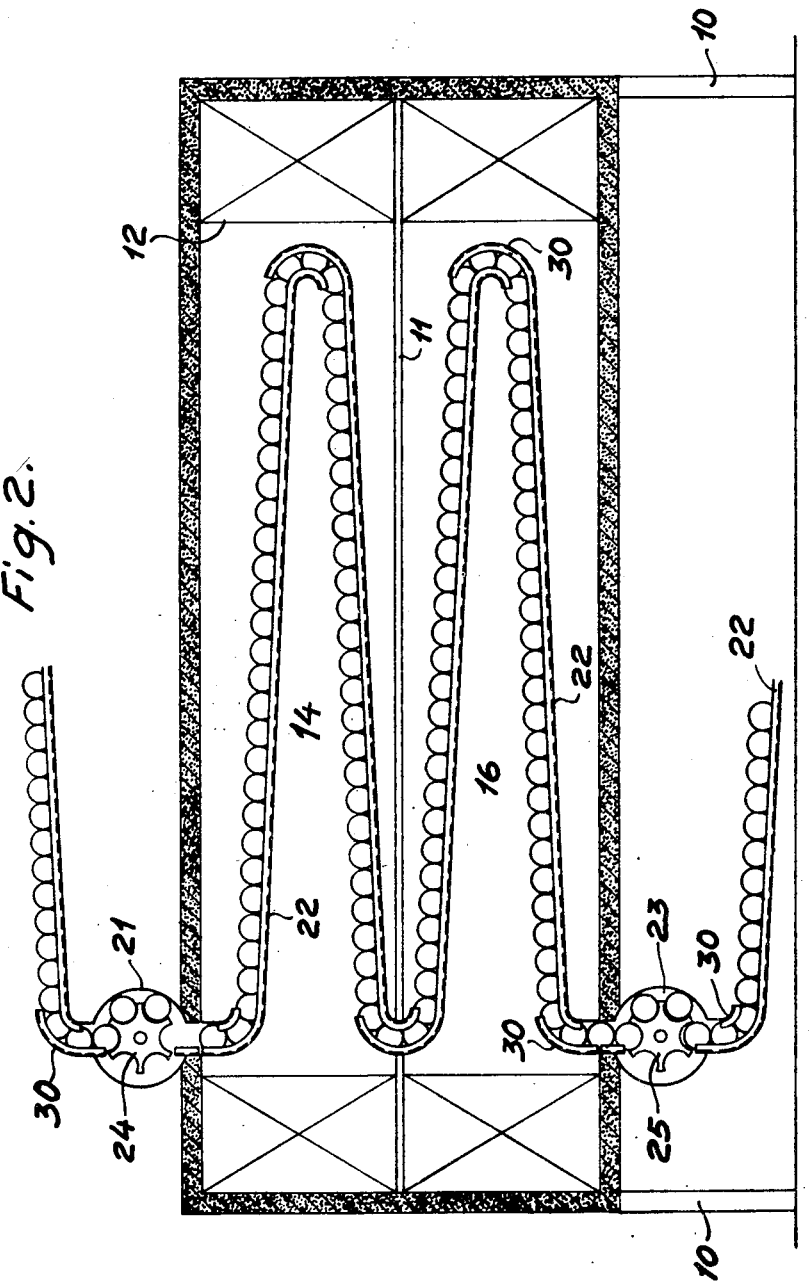

In the accompanying drawings one form of apparatus according to the invention is shown for the sterilization of foods packed in cylindrical cans. Fig. 1 is a perspective view of the apparatus with certain parts cut away to show the interior and Fig. 2 is a longitudinal section through one half of the apparatus according to Fig. 1.

The embodiment shown in the drawings consists of a housing resting on legs 10. The housing is insulated with glass wool or another suitable material and may be covered outwardly with fibrous boards or teak wood. The housing is divided into one upper chamber and one lower by means of a horizontal partition 11. The upper chamber is divided into two compartments 13 and 14 by means of a partition 12 and the lower chamber is by means of a partition 15 divided into two compartments of which only one indicated by 16 is shown in the drawing. The partitions 12 and 15 do not reach the gable ends of the housing but an opening is situated close to the gable ends. In the compartment 13 a fan wheel 17 is placed in the one end driven by means of an electric motor 18 and in the compartment situated below a fan is correspondingly provided driven by means of a motor 19. Approximately in the middle of the compartment 13 an electrical heating element 20 is placed and correspondingly a similar heating element is placed in the compartment located below the compartment 13. In the compartment 14 at the end, opposite the one where the fan is located a conveyor 22 opens into a sluice 21 which conveyor extends to the other end of the compartment from where it returns to the first mentioned end of the compartment 14 and then passes down to the compartment 16 located below and passes through this compartment in the same manner. The conveyor 22 leaves the compartment 16 through a sluice 23. The sluices 21 and 23 are alike and consist of tooth wheels 24 and 25 respectively arranged in a housing. The tooth wheel 24 is driven by a motor 26 over a chain transmission 27, 28, and the tooth wheel 25 is driven by the same motor over a chain 29 so that both tooth wheels operate synchronously, i. e. when a can is fed in through the sluice 21 a ready treated can is fed out through the sluice 23. At the sluices and at the places where the conveyor returns it is provided with guiding means 30 to hold the cans in position. The housing is provided with inspection windows 31, so that the operation in the interior of the apparatus may be observed from outside.

Sterilization of peas is carried out in the following manner: After blanching in usual manner the filled and closed cans are introduced into the sterilization apparatus through the sluice 21 to the stationary conveyor 22 and the fans are started at the same time as the electric current for the heaters is closed. The air in the compartments 13 and 14 is in this way caused to circulate at atmospheric pressure around the conveyor and a corresponding circulation of the current of air takes place in the compartments situated below. The temperature is controlled in the upper compartments 13 and 14 so that it is maintained at about 135° C. whereby the cans reach the sterilization temperature rapidly. In the compartments situated below the temperature is maintained at about 120° C., i. e. sterilization temperature. The cans are fed in through the sluice 21 at a suitable rate and roll by their own weight through the whole apparatus and are fed out at the same speed with which they are fed into the apparatus on account of the synchronisation of the sluices. The time for the treatment of the peas in the apparatus is, of course, chosen in such a way that the peas are ready sterilized when the cans leave the apparatus.

In the embodiment shown the cans rotate at the same time as they are conveyed through the apparatus which means a great advantage as a stirring of the contents of the cans is obtained whereby the heat transmission is facilitated and made more uniform. It is however not necessary that the cans rotate during the transport but they may also slide along the conveyor or be carried forward in another way. It is not necessary to incline the conveyor but the transport may be carried out in another way.

The conveyor is divided into several exchangeable parts so that containers of different sizes may be introduced into and treated in the apparatus. On account of the fact that there are no movable parts there is no risk for the conveyor to catch or get broken.

Having now described my invention, what I claim as new and desire to secure by Letters Patent is:

1. A sterilizing method comprising introducing hermetically sealed containers of food stuffs continuously into a chamber containing a non-condensing gas and passing the containers progressively through the chamber, stirring the contents of the containers as they pass through the chamber, heating the non-condensing gas and circulating it in the chamber at a speed of at least 5 meters per second in a closed cycle including the moving containers and thereby sterilizing the food stuffs at a temperature between 80° and 150° C., and continuously removing the containers of sterilized food stuffs from the chamber.

2. A sterilizing method as defined in claim 1 in which the stirring is effected by causing the containers to roll as they pass through the chamber.

3. A sterilizing method as defined in claim 1 in which the introduction and removal of containers are synchronized.

4. A sterilizing method as defined in claim 1 in which the non-condensing gas is heated to a temperature between 120° and 170° C.

5. A sterilizing method comprising introducing hermetically sealed containers of food stuffs continuously into the first of a series of chambers each containing a non-condensing gas and passing the containers progressively through the chambers in succession, rotating the containers as they pass through the chambers, separately heating the non-condensing gas and circulating it in each chamber at a speed of at least 5 meters per second in a closed cycle including the moving containers and thereby sterilizing the contents of the containers at a temperature between 80° and 150° C., and continuously removing the containers of sterilized food stuffs from the last of said chambers.

6. A sterilizing method, as defined in claim 5 in which the contents of the containers are brought up to sterilizing temperature throughout the containers in the first of said chambers and are held at that temperature until discharged from the last chamber.

References Cited in the file of this patent

UNITED STATES PATENTS

| | | |
|---|---|---|
| 1,596,606 | Fooks | Aug. 17, 1926 |
| 1,709,481 | Mullen | Apr. 16, 1929 |
| 2,000,514 | Enock | May 7, 1935 |
| 2,472,970 | Hanna | June 14, 1949 |
| 2,539,505 | Barnum et al. | Jan. 30, 1951 |
| 2,607,698 | Martin | Aug. 19, 1952 |